US010787172B2

(12) United States Patent
Aoki et al.

(10) Patent No.: US 10,787,172 B2
(45) Date of Patent: Sep. 29, 2020

(54) DRIVING ASSISTANCE DEVICE AND DRIVING ASSISTANCE METHOD

(71) Applicant: Nissan Motor Co., Ltd., Yokohama-shi, Kanagawa (JP)

(72) Inventors: Motonobu Aoki, Kanagawa (JP); Naoki Kojo, Kanagawa (JP); Takura Yanagi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/614,617

(22) PCT Filed: May 19, 2017

(86) PCT No.: PCT/JP2017/018904
§ 371 (c)(1),
(2) Date: Nov. 18, 2019

(87) PCT Pub. No.: WO2018/211708
PCT Pub. Date: Nov. 22, 2018

(65) Prior Publication Data
US 2020/0231151 A1 Jul. 23, 2020

(51) Int. Cl.
B60W 30/16 (2020.01)
G05D 1/02 (2020.01)
B60W 30/14 (2006.01)
B62D 15/02 (2006.01)

(52) U.S. Cl.
CPC .......... B60W 30/16 (2013.01); B60W 30/143 (2013.01); B62D 15/0255 (2013.01); G05D 1/0246 (2013.01); B60W 2420/42 (2013.01)

(58) Field of Classification Search
CPC ..... B60W 30/16; B60W 30/165; B60W 30/17
See application file for complete search history.

(56) References Cited

U.S. PATENT DOCUMENTS

| 2015/0046038 A1* | 2/2015 | Kawamata ............ B60W 50/14 701/41 |
| 2015/0344034 A1 | 12/2015 | Niino et al. |
| 2015/0353087 A1 | 12/2015 | Niino et al. |
| 2015/0353987 A1* | 12/2015 | Vallejo, Jr. ......... G01N 21/6486 435/19 |
| 2016/0339914 A1 | 11/2016 | Habu et al. |

(Continued)

FOREIGN PATENT DOCUMENTS

| JP | 2002-092795 A | 3/2002 |
| JP | 2006-251888 A | 9/2006 |
| JP | 2009-143272 A | 7/2009 |

(Continued)

Primary Examiner — Kenneth J Malkowski
(74) Attorney, Agent, or Firm — Young Basile Hanlon & MacFarlane, P.C.

(57) ABSTRACT

A driving assistance apparatus comprises a processor for: determining whether or not a preceding vehicle is traveling outside an area including an intersection and vicinities of the intersection; when the preceding vehicle is traveling outside the area, determining whether or not a direction indicator of the preceding vehicle on a road shoulder side is lighting; and when the direction indicator is lighting, performing second driving assistance different from first driving assistance for following the preceding vehicle.

12 Claims, 8 Drawing Sheets

(56) References Cited

U.S. PATENT DOCUMENTS

2018/0099668 A1   4/2018  Niino et al.
2019/0016336 A1   1/2019  Niino et al.

FOREIGN PATENT DOCUMENTS

| JP | 2012-118795 A | 6/2012 |
| JP | 2015-228093 A | 12/2015 |
| JP | 2015-229466 A | 12/2015 |
| JP | 2016-215761 A | 12/2016 |
| JP | 2016-222096 A | 12/2016 |
| WO | 2016/024318 A1 | 2/2016 |
| WO | 2016/027349 A1 | 2/2016 |

* cited by examiner

DRIVING ASSISTANCE DEVICE AND DRIVING ASSISTANCE METHOD

TECHNICAL FIELD

The present invention relates to a driving assistance apparatus and a driving assistance method that assist the driving of a vehicle.

BACKGROUND

Known techniques for this type of apparatuses include an image recognition apparatus that allows the driver of a subject car to recognize a deceleration action of preceding cars (JP2012-118795A). The preceding cars include a first preceding car traveling just ahead of the subject car and a second preceding car traveling ahead of the first preceding car. The image recognition apparatus operates to recognize the first or second preceding car turning on the brake lamps or hazard lamps and thereby allow the driver of the subject car to recognize the deceleration action of the second preceding car.

SUMMARY

In the prior art, when the direction indicator of a preceding vehicle is lighting, it is not possible to distinguish whether the lighting is that for turning to the right or left at an intersection or that for stopping on a road shoulder. A problem therefore arises in that when the preceding vehicle stops while lighting the direction indicator, appropriate driving assistance for the subject vehicle cannot be performed, and an uncomfortable feeling may be given to the occupants of the subject vehicle.

A problem to be solved by the present invention is to perform appropriate driving assistance and alleviate an uncomfortable feeling given to the occupants of the subject vehicle even when a preceding vehicle stops while lighting the direction indicator.

The present invention solves the above problem through: determining whether or not a preceding vehicle is traveling outside an area including an intersection and vicinities of the intersection; when the preceding vehicle is traveling outside the area, determining whether or not a direction indicator of the preceding vehicle on a road shoulder side is lighting; and when the direction indicator is lighting, performing second driving assistance different from first driving assistance for following the preceding vehicle.

According to the present invention, appropriate driving assistance can be performed in accordance with the situation of the preceding vehicle, and an uncomfortable feeling given to the occupants of the subject vehicle can be alleviated.

DETAILED DESCRIPTION

Hereinafter, embodiments of the present invention will be described with reference to the drawings.

First Embodiment

In the present embodiment, an exemplary case will be described in which the driving assistance apparatus according to the present invention is applied to a driving assistance system configured such that the driving assistance apparatus cooperates with an onboard apparatus 200 equipped in a vehicle.

Figure 1:
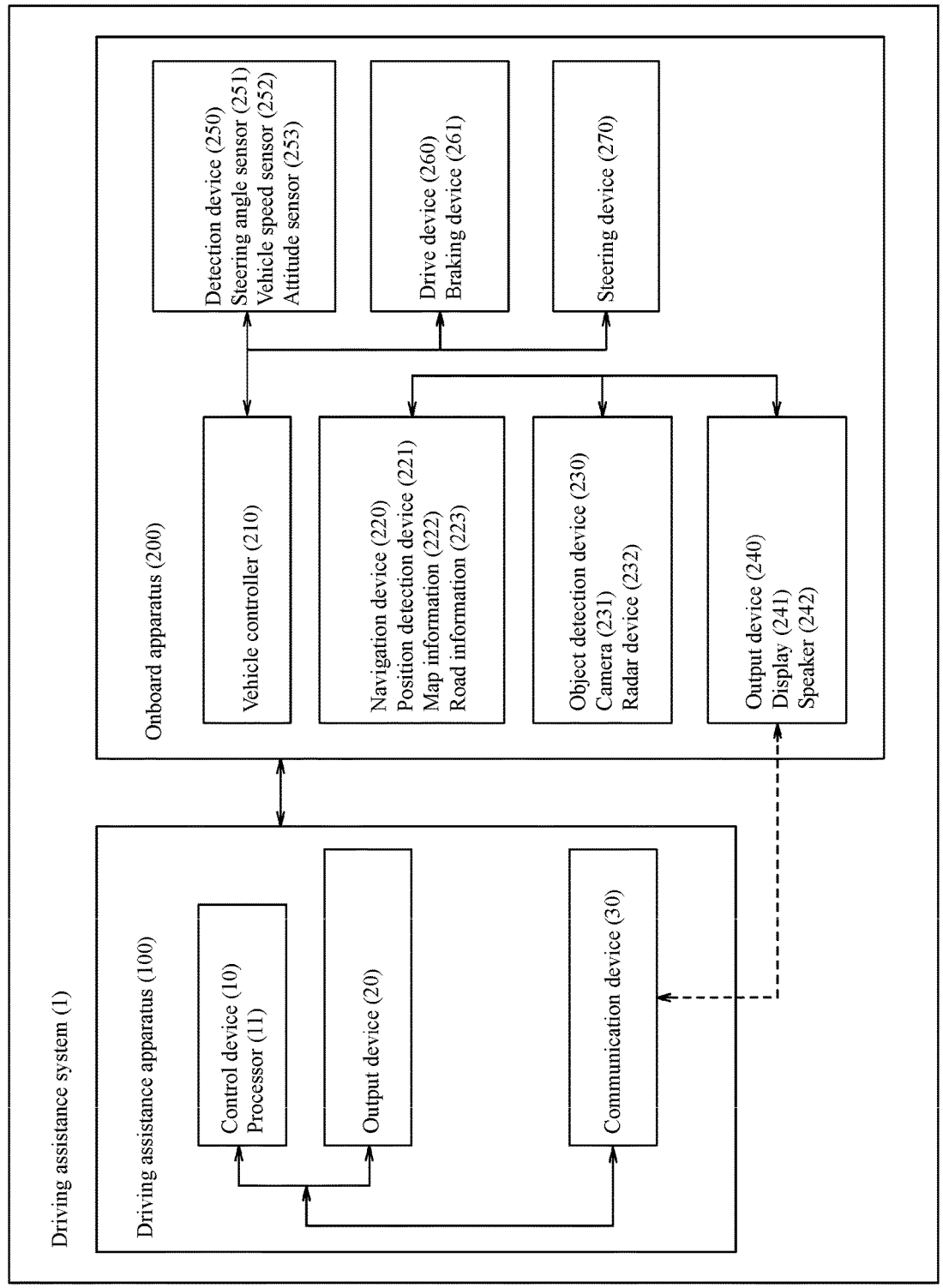
FIG. 1 is a block configuration diagram of a driving assistance system according to a first embodiment of the present invention.

FIG. 1 is a diagram illustrating the block configuration of a driving assistance system 1. The driving assistance system 1 of the present embodiment includes a driving assistance apparatus 100 and an onboard apparatus 200. Embodiments of the driving assistance apparatus 100 of the present invention are not limited, and the driving assistance apparatus may be equipped in a vehicle or may also be applied to a portable terminal device capable of exchanging information with the onboard apparatus 200. Examples of such a terminal device include equipment, such as a smartphone or a PDA. The driving assistance system 1, the driving assistance apparatus 100, the onboard apparatus 200, and various devices included therein may each be a computer that includes an arithmetic processing unit, such as one or more CPUs, and executes arithmetic processing.

The onboard apparatus 200 will first be described.

The onboard apparatus 200 of the present embodiment includes a vehicle controller 210, a navigation device 220, an object detection device 230, and an output device 240. These devices which constitute the onboard apparatus 200 are connected to one another via a controller area network (CAN) or other onboard LAN to mutually exchange information. The onboard apparatus 200 can exchange information with the driving assistance apparatus 100 via such an onboard LAN. The vehicle controller 210 operates the output device 240, a drive device 260, and a steering device 270.

The vehicle controller 210 of the present embodiment is provided with a detection device 250. The detection device 250 has a steering angle sensor 251, a vehicle speed sensor 252, and an attitude sensor 253. The steering angle sensor 251 detects information on a steering amount, a steering speed, steering acceleration, and the like and outputs the detection results to the vehicle controller 210. The vehicle speed sensor 252 detects a speed and/or acceleration of the vehicle and outputs the detection results to the vehicle controller 210. The attitude sensor 253 detects a position of the vehicle, a pitch angle of the vehicle, a yaw angle of the vehicle, and a roll angle of the vehicle and outputs the detection results to the vehicle controller 210. The attitude sensor 253 includes a gyrosensor.

The vehicle controller 210 of the present embodiment, which is an onboard computer such as an engine control unit (ECU), electronically controls the driving of the vehicle. The vehicle may be, for example, an electric car having an electric motor as the travel driving source, an engine car having an internal-combustion engine as the travel driving source, or a hybrid car having both an electric motor and an internal-combustion engine as the travel driving sources. Examples of the electric car or hybrid car having an electric motor as the travel driving source include those of a type in which the power source for the electric motor is a secondary battery and a type in which the power source for the electric motor is a fuel cell.

The drive device 260 of the present embodiment includes a drive mechanism of a subject vehicle. The drive mechanism includes an electric motor and/or an internal-combustion engine as the above-described travel driving sources, a power transmission device including a drive shaft and an automatic transmission that transmit the output from the travel driving source or sources to the driving wheels, a braking device 261 that brakes wheels, and other necessary components. The drive device 260 executes the travel control, which includes acceleration and deceleration of the vehicle, through generating control signals for these components of the drive mechanism on the basis of the input signals by an accelerator operation and a brake operation and the control signals acquired from the vehicle controller 210 or the driving assistance apparatus 100. The travel control including acceleration and deceleration of the vehicle can be performed in an automated or autonomous manner by transmitting the control information to the drive device 260. In the case of a hybrid car, a ratio of the torque output to the electric motor and the torque output to the internal-combustion engine in accordance with the traveling state of the vehicle is also transmitted to the drive device 260.

The steering device 270 of the present embodiment includes a steering actuator. The steering actuator includes a motor and other necessary components attached to the steering column shaft. The steering device 270 executes control of varying the traveling direction of the vehicle on the basis of the control signals acquired from the vehicle controller 210 or the input signals by a steering operation. The vehicle controller 210 transmits the control information, which includes the steering amount, to the steering device 270 thereby to execute the steering control of the subject vehicle so that the subject vehicle travels along the travel route. In addition or alternatively, the driving assistance apparatus 100 may execute the control of the traveling direction of the vehicle by controlling the braking amount for each wheel of the vehicle. In this case, the vehicle controller 210 transmits the control information, which includes the braking amount for each wheel, to the braking device 261 thereby to execute the control of the traveling direction of the vehicle. Control of the drive device 260 and/or control of the steering device 270 may be performed in a completely automated or autonomous manner or in a form of assisting with the driving operation (traveling operation) of the driver. Control of the drive device 260 and control of the steering device 270 can be suspended/canceled by an intervention operation of the driver. The vehicle controller 210 controls the driving of the subject vehicle in accordance with a driving assistance process executed by a processor 11.

The onboard apparatus 200 of the present embodiment includes the navigation device 220. The navigation device 220 calculates a route from the current position of the subject vehicle to a destination. The scheme of calculating the route may be a known scheme at the time of filing of the present application based on a graph search algorithm, such as Dijkstra's algorithm or A* search algorithm. The calculated route is transmitted to the vehicle controller 210 to be used for the driving assistance for the subject vehicle. The calculated route is also output as route guidance information via the output device 240, which will be described later.

The navigation device 220 includes a position detection device 221. The position detection device 221 is responsible to the Global Positioning System (GPS) and detects a traveling position (latitude/longitude) of the vehicle traveling.

The navigation device 220 includes accessible map information 222 and road information 223. It suffices that the map information 222 and the road information 223 can be read by the navigation device 220. The map information 222 and the road information 223 may be stored in a database configured to be physically separated from the navigation device 220 or may also be stored in a server from which the stored information is readable via a communication device 30 (or a communication device provided in the onboard apparatus 200).

The map information 222 is a so-called electronic map that represents information in which the latitude and longitude are associated with the map information. The map information 222 has the road information 223 which is associated with each point.

The road information 223 is defined by nodes and links connecting between the nodes. The road information 223 includes information for specifying a road by a position/region of the road, information on the road type and road width of each road, and information on the shape of a road. The road information 223 is stored such that identification information of each road link is associated with the position of an intersection, the entering direction into the intersection, the type of the intersection, and other information regarding the intersection. In addition or alternatively, the road information 223 may be stored such that the identification information of each road link is associated with the road type, the road width, the road shape, whether or not the straight-ahead traveling is permitted, the priority relationship in traveling, whether or not the overtaking is permitted (whether or not the lane change to an adjacent lane is permitted), and other information regarding the road. In an embodiment, the road information 223 has information as to whether or not the overtaking is permitted based on traffic rules.

The navigation device 220 specifies a travel route along which the subject vehicle travels, on the basis of the current position of the subject vehicle detected by the position detection device 221. The travel route is a planned travel route for the subject vehicle and/or a travel route along which the subject vehicle has actually traveled. The travel route may also be a route to a destination designated by the user or a route to a destination estimated on the basis of the travel history of the subject vehicle/user. The travel route along which the subject vehicle travels may be specified for each road, specified for each road on which the inbound/outbound direction is designated, or specified for each single lane in which the subject vehicle actually travels. The navigation device 220 refers to the road information 223, which will be described later, to specify the road link for each lane of the travel route along which the subject vehicle travels.

The travel route includes specifying information (coordinate information) for one or more points through which the subject vehicle will travel in the future. The travel route includes at least a point that suggests the next traveling position at which the subject vehicle travels. The travel route may be composed of a continuous line or may also be composed of discrete points. Although not particularly limited, the travel route is specified by a road identifier, a lane identifier, and/or a link identifier. These road identifier, lane identifier, and link identifier are defined in the map information 222 and/or the road information 223.

The onboard apparatus 200 includes the object detection device 230. The object detection device 230 detects the situation around the subject vehicle. The object detection device 230 of the subject vehicle detects the existence and existing positions of objects including obstacles that may exist around the subject vehicle. Although not particularly limited, the object detection device 230 includes a camera 231. The camera 231 is, for example, an imaging device comprising an imaging element such as a CCD. The camera 231 may also be an infrared camera or a stereo camera. The camera 231 is disposed at a certain position of the subject vehicle and captures images of objects around the subject vehicle. The term "around the subject vehicle" as used herein encompasses the concepts of "ahead of the subject vehicle," "behind the subject vehicle," "laterally to the subject vehicle on the left side," and "laterally to the subject vehicle on the right side." Objects include two-dimensional signs such as stop lines or lane boundary lines painted on the road surface. Objects include three-dimensional objects. Objects include stationary objects such as traffic signs. Objects include moving objects such as pedestrians, two-wheel vehicles, and four-wheel vehicles (other vehicles). Objects include road structures such as guardrails, median strips, and curbstones.

The object detection device 230 may analyze the image data and identify the type of an object on the basis of the analysis result. The object detection device 230 uses a pattern matching technique or other similar technique to identify whether or not the object included in the image data is a vehicle, a pedestrian, a traffic sign, or a two-dimensional sign painted on the road surface. The object detection device 230 processes the obtained image data to acquire the distance from the subject vehicle to an object existing around the subject vehicle on the basis of the position of the object. In particular, the object detection device 230 acquires the positional relationship between the object and the subject vehicle.

The object detection device 230 may include a radar device 232. Examples of the radar device 232 include those, such as millimeter-wave radar, laser radar, ultrasonic radar, and laser range finder, which are of schemes known at the time of filing of the present application. The object detection device 230 detects presence or absence of objects, positions of the objects, distances to the objects, relative speeds of the objects to the subject vehicle on the basis of the received signals from the radar device 232. The object detection device 230 may detect presence or absence of objects, positions of the objects, distances to the objects, and relative speeds of the objects to the subject vehicle on the basis of clustering results of point cloud information which is acquired using the laser radar.

When another vehicle and the subject vehicle are capable of vehicle-to-vehicle communication, the object detection device 230 may acquire the vehicle speed and acceleration of the other vehicle, which are detected by the vehicle speed sensor of the other vehicle, and/or the fact that the other vehicle is present, as object information. In addition or alternatively, the object detection device 230 can acquire the object information, which includes the position, speed, and acceleration of another vehicle, from external devices of the Intelligent Transport Systems (ITS).

The onboard apparatus 200 includes the output device 240. The output device 240 includes a display 241 and a speaker 242. The output device 240 outputs various information items regarding the driving assistance to the user or to occupants of surrounding vehicles. The output device 240 outputs information regarding the travel control. The output device 240 preliminarily informs the subject vehicle's occupants that the steering operation and/or acceleration or deceleration will be executed, via the display 241 and/or the speaker 242, as information representing the control information for the subject vehicle to travel on the travel route (target route). In addition or alternatively, the occupants of the subject vehicle or the occupants of other vehicles may be preliminarily informed of such information items regarding the driving assistance via exterior lamps and/or interior lamps. In addition or alternatively, the output device 240 may output various information items regarding the driving assistance to external devices of the Intelligent Transport Systems and the like via a communication device (not illustrated). When the travel route has been corrected, the output device may output the information that the travel route is corrected and the information on the corrected travel route.

The driving assistance apparatus 100 will then be described.

The driving assistance apparatus 100 includes a control device 10, an output device 20, and a communication device 30. The output device 20 has the same functions as those of the previously described output device 240 of the onboard apparatus 200. The display 241 and the speaker 242 are used as components of the output device 20. The control device 10 and the output device 20 can exchange information with each other via a wired or wireless communication line. The communication device 30 performs information exchange with the onboard apparatus 200, information exchange within the driving assistance apparatus 100, and information exchange with the external of the driving assistance system 1.

The control device 10 will first be described.

The control device 10 includes a processor 11. The processor 11 is a calculation device that performs a driving assistance process. Specifically, the processor 11 is a computer comprising a read only memory (ROM) that stores programs for executing the driving assistance process, a central processing unit (CPU) as an operation circuit that executes the programs stored in the ROM to serve as the driving assistance apparatus 100, and a random access memory (RAM) that serves as an accessible storage device.

The processor 11 according to the present embodiment executes the following processes:

(1) a process of recognizing the presence of a preceding vehicle (preceding vehicle recognition process);

(2) a process of keeping an inter-vehicle distance to the preceding vehicle constant when recognizing the preceding vehicle (inter-vehicle distance keeping process);

(3) a process of determining whether or not the preceding vehicle is traveling outside an area including an intersection and vicinities of the intersection, when recognizing the preceding vehicle (traveling location determination process);

(4) a process of determining whether or not a direction indicator of the preceding vehicle on the road shoulder side is lighting, when the preceding vehicle is traveling outside the area including the intersection and the vicinities of the intersection (direction indicator lighting detection process); and (5) a process of decelerating the subject vehicle when determining that the direction indicator on the road shoulder side is lighting (deceleration process).

The processor 11 executes each of the above functions by cooperation of software for realizing each function or for executing each process and the above-described hardware.

The preceding vehicle recognition process will first be described.

The processor 11 determines whether or not a preceding vehicle traveling ahead of the subject vehicle is present, on the basis of the detection result of the object detection device 230. For example, the processor 11 performs image processing on an image captured by the camera 231 which is mounted on the front part of the subject vehicle. When the captured image includes a preceding vehicle, the processor 11 determines that a preceding vehicle is present. On the other hand, when the captured image does not include a preceding vehicle, the processor 11 determines that a preceding vehicle is not present. Preceding vehicles include not only vehicles traveling ahead of the subject vehicle but also vehicles stopping ahead of the subject vehicle. The method of determining whether or not a preceding vehicle is present is not limited to the above-described method. For example, the determination may be made using the detection result of the radar device 232 mounted on the front part of the subject vehicle or the acquisition result of object information obtained by vehicle-to-vehicle communication.

The inter-vehicle distance keeping process will then be described.

When recognizing a preceding vehicle, the processor 11 generates, on the basis of the detection result of the object detection device 230, a control command for controlling the travel of the subject vehicle so as to keep the distance between the subject vehicle and the preceding vehicle (inter-vehicle distance) constant. For example, the processor 11 uses the detection result of the radar device 232 mounted on the front part of the subject vehicle. Using the relative position of the preceding vehicle and the relative speed of the preceding vehicle, the processor 11 generates a control command such that the inter-vehicle distance to the preceding vehicle is kept constant. The control command includes a command to control the drive device 260 (e.g., a command to control the vehicle speed, acceleration, and/or deceleration). The processor 11 sends the generated control command to the vehicle controller 210 via the communication device 30. The vehicle controller 210 controls the driving of the subject vehicle in accordance with the driving assistance process so that the subject vehicle keeps the inter-vehicle distance to the preceding vehicle constant.

The preceding vehicle recognition process and the inter-vehicle distance keeping process are not limited to the above-described methods, and a preceding vehicle recognition process or an inter-vehicle distance keeping process known at the time of filing of the present application can be appropriately used.

The traveling location determination process will then be described with reference to FIG. 2.

Figure 2:
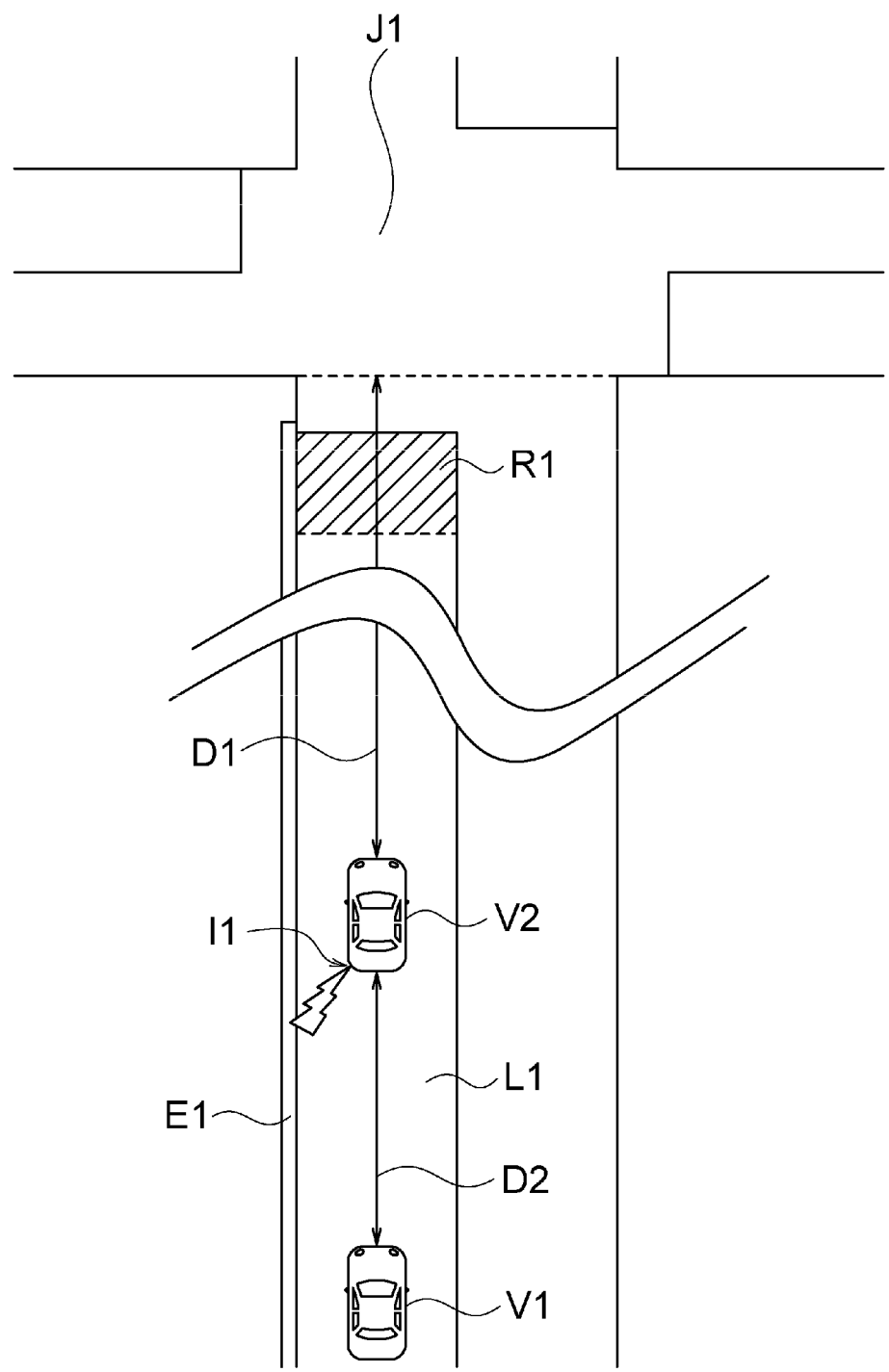
FIG. 2 is a diagram for describing an example of a driving assistance process in the first embodiment.

FIG. 2 is a diagram for describing an example of a driving assistance process in the present embodiment. The subject vehicle V1 is traveling on a road with one lane in each direction (lane L1), and a preceding vehicle V2 is traveling ahead of the subject vehicle V1. The subject vehicle V1 is following the preceding vehicle V2 while keeping the inter-vehicle distance to the preceding vehicle V2 (distance D2) constant by the above-described inter-vehicle distance keeping process. The lane L1 is included in a road that leads to an intersection J1. FIG. 2 illustrates a situation in which the subject vehicle V1 and the preceding vehicle V2 will reach the intersection J1 if continuing to travel in the lane L1. In the example of FIG. 2, the lane L1 is illustrated as that of a straight road, but the shape of the lane L1 is not particularly limited.

When a preceding vehicle is present, the processor 11 first specifies an intersection at which the preceding vehicle may turn to the right or left. For example, the processor 11 uses the planned travel route of the subject vehicle and the traveling position of the subject vehicle which are calculated by the navigation device 220. Using the planned travel route and the traveling position, the processor 11 specifies an intersection located closest to the current traveling position among intersections existing on the planned travel route. Specifically, the processor 11 specifies a node number that represents the intersection in the map information 222. The method of specifying the intersection is not limited to the above-described method. For example, among a plurality of intersections existing within a predetermined range from the traveling position of the subject vehicle, an intersection through which the subject vehicle will first pass or at which the subject vehicle will first turns to the right or left on the planned travel route may also be specified as the intersection. In the example of FIG. 2, the processor 11 specifies the intersection J1 using the above-described method.

Then, using the detection result of the position detection device 221 and the detection result of the object detection device 230, the processor 11 calculates the traveling position (coordinates) of the preceding vehicle in the map information 222. For example, the processor 11 calculates the traveling position of the preceding vehicle by reflecting the relative position of the preceding vehicle to the subject vehicle on the traveling position of the subject vehicle in the map information 222. In the example of FIG. 2, the processor 11 calculates the coordinates of the preceding vehicle V2 in the map information 222.

Then, the processor 11 calculates the distance from the preceding vehicle to the intersection on the basis of the map information 222. For example, the processor 11 calculates the distance from the preceding vehicle to the intersection in the map information 222 on the basis of the coordinates of the preceding vehicle, the coordinates of the intersection, and the link of the lane. Specifically, the processor 11 calculates the distance of the link existing between the coordinates of the preceding vehicle and the coordinates of the intersection. The calculated distance is a distance corresponding to an actual road shape rather than a linear distance connecting the two sets of coordinates. The coordinates of the intersection are not limited to the coordinates of the node included in the map information 222, and may be, for example, the coordinates of a stop line provided before the intersection. In the example of FIG. 2, the processor 11 calculates a distance D1 from the preceding vehicle V2 to the intersection J1 on the basis of the coordinates of the preceding vehicle V2, the coordinates of the intersection J1, and the link of the lane L1.

The method of calculating the distance from the preceding vehicle to the intersection is not limited to the above-described method. For example, the processor 11 may also calculate the distance from the subject vehicle to the intersection using the coordinates of the subject vehicle, the coordinates of the intersection, and the link information of the lane. Then, the processor 11 may calculate the distance from the preceding vehicle to the intersection by subtracting the inter-vehicle distance between the subject vehicle and the preceding vehicle, which is a detection result of the object detection device 230, from the calculated distance.

The processor 11 determines whether or not the preceding vehicle is traveling outside an area including the intersection and the vicinities of the intersection in accordance with whether or not the distance from the preceding vehicle to the intersection exceeds a predetermined threshold. When the distance from the preceding vehicle to the intersection exceeds the predetermined threshold, the processor 11 determines that the preceding vehicle is traveling outside the area including the intersection and the vicinities of the intersection. On the other hand, when the calculated distance does not exceed the predetermined threshold, the processor 11 determines that the preceding vehicle is traveling in the area including the intersection and the vicinities of the intersection. In the example of FIG. 2, when the distance D1 exceeds the predetermined threshold, the processor 11 determines that the preceding vehicle V2 is traveling outside the area including the intersection J1 and the vicinities of the intersection J1.

The vicinities of an intersection refer to a region before the intersection in which a direction indicator may be lit to turn to the right or left at the intersection. In the example of FIG. 2, the vicinities of the intersection J1 include a region (region R1) in which the driver operates the left-side direction indicator to light before the intersection J1 in order to turn to the left at the intersection J1. The vicinities of the intersection J1 refer, for example, to an area of 30 m before the intersection from the stop line of the intersection.

The processor 11 can set the above-described predetermined threshold in units of several meters and can appropriately set the predetermined threshold in accordance with the type of an intersection, the type of a road, the number of lanes, the amount of traffic, etc. The processor 11 may set a predetermined threshold for each land area in which the subject vehicle travels. Preferably, the predetermined threshold is set in consideration of the distance between intersections. Preferably, for example, the minimum value of the predetermined threshold is set to the distance from the stop line of an intersection to a position at which the direction indicator is lit before the intersection, and the maximum value of the predetermined threshold is set to the distance between intersections. This allows an accurate determination to be made as to whether or not the preceding vehicle is traveling outside the area including an intersection and the vicinities of the intersection.

The direction indicator lighting detection process will then be described.

When the preceding vehicle is traveling outside the area including an intersection and the vicinities of the intersection, the processor 11 determines whether or not the direction indicator of the preceding vehicle on the road shoulder side has started lighting, on the basis of the detection result of the object detection device 230. For example, the processor 11 detects the lighting of the direction indicator on the road shoulder side from an image captured by the camera 231 ahead of the subject vehicle. Specifically, the processor 11 can detect the lighting of the direction indicator in accordance with the luminance of one or more pixels in the captured image that represent the direction indicator. When the amount of change in the luminance exceeds a predetermined threshold during a predetermined time, the processor 11 detects the lighting of the direction indicator. The "lighting" of a direction indicator includes the "flashing" of the direction indicator. In the example of FIG. 2, the processor 11 detects that a left-side direction indicator I1 of the preceding vehicle V2 is lighting.

In the case of left-hand traffic, the road shoulder refers to a belt-like portion provided to be connected to the left side of the lane L1 with respect to the traveling direction. In the example of FIG. 2, a road shoulder E1 is provided on the left side of the lane L1 with respect to the traveling direction. Accordingly, the left-side direction indicator I1 of the preceding vehicle V2 is a direction indicator provided on the road shoulder E1 side among the direction indicators provided on the right and left of the preceding vehicle V2.

The deceleration process will be finally described.

When determining that the direction indicator of the preceding vehicle on the road shoulder side is lighting, the processor 11 generates a control command for decelerating the subject vehicle. Specifically, the processor 11 generates a control command for stopping the above-described inter-vehicle distance keeping process and decelerating the subject vehicle. The control command includes a command to control the drive device 260 (e.g., a command to control the vehicle speed and/or acceleration). The processor 11 sends the generated control command to the vehicle controller 210 via the communication device 30. The vehicle controller 210 controls the driving of the subject vehicle in accordance with the driving assistance process so that the subject vehicle decelerates. In the example of FIG. 2, when the preceding vehicle V2 is about to stop on the road shoulder E1 while lighting the left-side direction indicator I1, the subject vehicle V1 can be preliminarily decelerated to increase the inter-vehicle distance to the preceding vehicle V2.

The processor 11 executes the above-described driving assistance process thereby to determine whether or not the traveling location of the preceding vehicle is within an area including an intersection and the vicinities of the intersection. The processor 11 can determine whether or not the preceding vehicle is lighting the direction indicator to turn to the right or left at the intersection. This can prevent the subject vehicle from stopping to follow the preceding vehicle even when the preceding vehicle lights the direction indicator to stop on the road shoulder. Moreover, the processor 11 can preliminarily estimate the travel of the preceding vehicle before the preceding vehicle stops on the road shoulder. This allows the driving assistance to be executed with a margin before the preceding vehicle decelerates while changing the direction leftward.

Figure 3:
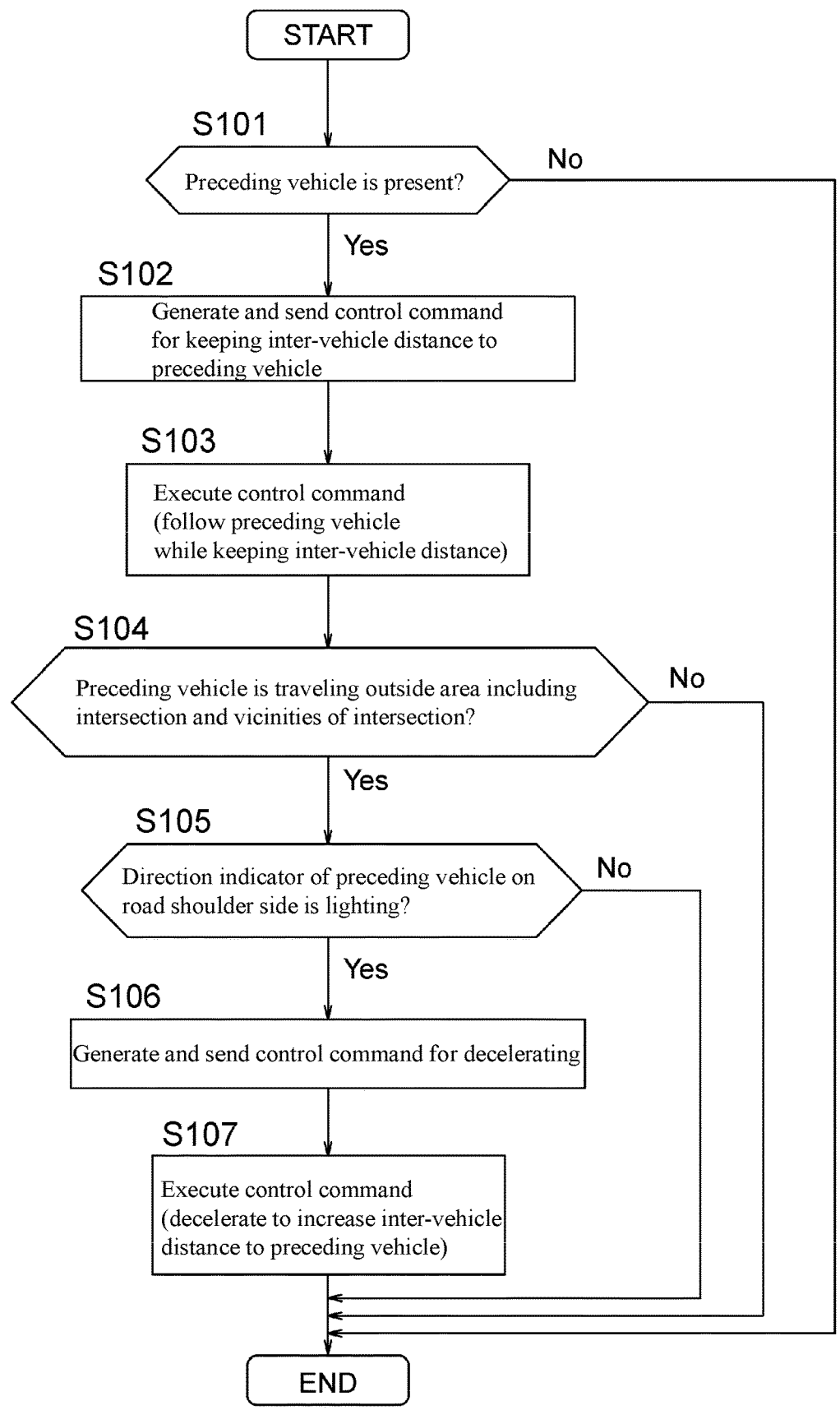
FIG. 3 is a flowchart illustrating a control procedure executed by the driving assistance system of the first embodiment.

FIG. 3 is a flowchart illustrating a control procedure executed by the driving assistance system of the present embodiment. The control process for the driving assistance of the present embodiment will be described with reference to the flowchart of FIG. 3. The control process for the driving assistance described below is repeatedly executed at predetermined time intervals.

In step S101, the processor 11 determines whether or not a preceding vehicle is present. For example, the processor 11 acquires an image captured ahead of the subject vehicle from the object detection device 230 of the subject vehicle. Then, the processor 11 executes the image processing on the captured image to determine whether or not a preceding vehicle is present. When a determination is made that a preceding vehicle is present, the process proceeds to step S102, while when a determination is made that no preceding vehicle is present, the control process for the driving assistance is ended.

In step S102, the processor 11 generates a control command for the subject vehicle to follow the preceding vehicle while keeping the inter-vehicle distance to the preceding vehicle constant. The processor 11 acquires the relative speed of the preceding vehicle from the detection result of the radar device 232 of the subject vehicle. The processor 11 generates a control command to follow the preceding vehicle so that the acquired relative speed is kept constant, and sends the generated control command to the vehicle controller 210.

In step S103, the vehicle controller 210 executes the control command generated in step S102. This allows the subject vehicle to follow the preceding vehicle while keeping the inter-vehicle distance constant.

In step S104, the processor 11 determines whether or not the preceding vehicle is traveling outside the area including an intersection and the vicinities of the intersection. For example, the processor 11 specifies, in the map information 222, an intersection located closest to the current traveling position of the preceding vehicle. Then, the processor 11 calculates the distance from the current traveling position of the preceding vehicle to the specified intersection. When the calculated distance exceeds a predetermined threshold, the processor 11 determines that the preceding vehicle is traveling outside the area including the intersection and the vicinities of the intersection. On the other hand, when the calculated distance does not exceed the predetermined threshold, the processor 11 determines that the preceding vehicle is traveling in the area including the intersection and the vicinities of the intersection. When the preceding vehicle is traveling outside the area including the intersection and the vicinities of the intersection, the process proceeds to step S104. On the other hand, when the preceding vehicle is traveling in the area including the intersection and the vicinities of the intersection, the control process for the driving assistance is ended.

In step S105, the processor 11 determines whether or not the direction indicator of the preceding vehicle on the road shoulder side is lighting. For example, the processor 11 determines whether or not the direction indicator of the preceding vehicle on the road shoulder side is lighting, from the image captured ahead of the subject vehicle. When a determination is made that the direction indicator on the road shoulder side is lighting, the process proceeds to step S106. On the other hand, when a determination is made that the direction indicator on the road shoulder side is not lighting, the control process for the driving assistance is ended.

In step S106, the processor 11 generates a control command for decelerating and sends the generated control command to the vehicle controller 210. The processor 11 determines that the preceding vehicle traveling is about to stop on the road shoulder, from the determination result of step S104 and the determination result of step S105.

In step S107, the vehicle controller 210 executes the control command generated in step S106. This allows the subject vehicle to decelerate in order to increase the inter-vehicle distance to the preceding vehicle. After the vehicle controller 210 controls the subject vehicle to decelerate, the control process for the driving assistance is ended.

As described above, the driving assistance apparatus 100 according to the present embodiment includes the communication device 30 configured to acquire a detection result of the object detection device 230 which detects the situation around the subject vehicle and the processor 11 configured to execute the driving assistance process for the subject vehicle on the basis of the detection result of the object detection device 230. The processor 11 determines whether or not a preceding vehicle is traveling outside an area including an intersection and vicinities of the intersection. Then, when the preceding vehicle is traveling outside the area, the processor 11 determines whether or not a direction indicator of the preceding vehicle on the road shoulder side is lighting. When the direction indicator of the preceding vehicle on the road shoulder side is lighting, the processor 11 generates a control command for performing driving assistance different from the driving assistance for following the preceding vehicle and transmits the generated control command to the vehicle controller 210. This can prevent the subject vehicle from following the preceding vehicle even when the preceding vehicle lights the direction indicator to stop on the road shoulder, and an uncomfortable feeling given to the occupants of the subject vehicle can be alleviated.

In the present embodiment, the driving assistance different from the driving assistance to follow the preceding vehicle is driving assistance to control the vehicle speed of the subject vehicle. This allows the appropriate driving assistance to be executed in accordance with the situation of the preceding vehicle.

In the present embodiment, the driving assistance different from the driving assistance to follow the preceding vehicle is driving assistance to decelerate the subject vehicle. This can increase the inter-vehicle distance to the preceding vehicle before the preceding vehicle stops on the road shoulder, and the driving assistance can be executed to reduce the risk felt by the occupants.

In the present embodiment, when the subject vehicle is following the preceding vehicle while keeping the inter-vehicle distance to the preceding vehicle constant, the driving assistance different from the driving assistance to follow the preceding vehicle is driving assistance to increase the inter-vehicle distance to the preceding vehicle. This can increase the inter-vehicle distance to the preceding vehicle even when the preceding vehicle decelerates to stop on the road shoulder. As a result, the driving assistance can be executed with a margin for the subsequent actions.

Second Embodiment

Next, a driving assistance apparatus 110 according to the second embodiment will be described. The driving assistance apparatus 110 according to the present embodiment includes a control device 10, an output device 20, and a communication device 30. The control device 10 includes a processor 111. The processor 111 has the same configuration as that of the processor 11 according to the above-described embodiment except that the driving assistance process is different. Accordingly, the description of the above-described embodiment made with reference to FIG. 1 will be borrowed herein.

The processor 111 according to the present embodiment executes the following processes:

(1) a process of recognizing the presence of a preceding vehicle (preceding vehicle recognition process);

(2) a process of following the travel route of the preceding vehicle when recognizing the preceding vehicle (travel route following process);

(3) a process of keeping the inter-vehicle distance to the preceding vehicle constant when recognizing the preceding vehicle (inter-vehicle distance keeping process);

(4) a process of determining whether or not the preceding vehicle is a bus, when recognizing the preceding vehicle (bus determination process);

(5) a process of determining whether or not the preceding vehicle is traveling in an area including a bus stop and vicinities of the bus stop, when the preceding vehicle is a bus (bus traveling location determination process);

(6) a process of determining whether or not a direction indicator of the preceding vehicle on the road shoulder side is lighting, when the preceding vehicle is traveling in the area including the bus stop and the vicinities of the bus stop (direction indicator lighting detection process);

(7) a process of decelerating the subject vehicle when a determination is made that the direction indicator on the road shoulder side is lighting (deceleration process);

(8) a process of canceling the follow-up to the travel route of the preceding vehicle when a determination is made that the direction indicator on the road shoulder side is lighting (travel route follow-up cancellation process);

(9) a process of setting a travel route for keeping a predetermined distance with respect to the opposite side to the road shoulder side (overtaking preparation process);

(10) a process of determining whether or not it is possible to overtake the preceding vehicle (overtaking determination process); and

(11) a process of overtaking the preceding vehicle when determining that it is possible to overtake the preceding vehicle (overtaking process).

The preceding vehicle recognition process is the same process as the preceding vehicle recognition process executed by the processor 11 of the above-described embodiment, so the description in the above-described embodiment will be borrowed herein.

The travel route following process will then be described.

When recognizing a preceding vehicle, the processor 111 generates, on the basis of the detection result of the object detection device 230, a control command for the subject vehicle to follow the travel route of the preceding vehicle. For example, the processor 111 uses the detection result of the radar device 232 mounted on the front part of the subject vehicle. The processor 111 generates a control command such that the relationship between the position of the subject vehicle in the vehicle width direction and the position of the preceding vehicle in the vehicle width direction is fixed. The control command includes a command to control the steering device 270 or the braking device 261 (e.g., a command to control the steering amount of the steering and/or the braking amount for each wheel). The vehicle controller 210 controls the driving of the subject vehicle in accordance with the driving assistance process so that the travel route of the subject vehicle coincides with the travel route of the preceding vehicle.

The travel route following process is not limited to the above-described method, and a travel route following process known at the time of filing of the present application can be appropriately used.

The inter-vehicle distance keeping process is the same process as the inter-vehicle distance keeping process executed by the processor 11 of the above-described embodiment, so the description in the above-described embodiment will be borrowed herein.

The bus determination process will then be described.

When recognizing a preceding vehicle, the processor 111 determines whether or not the preceding vehicle is a bus, on the basis of the detection result of the object detection device 230. For example, the processor 111 executes a pattern matching process on an image captured by the camera 231 mounted on the front part of the subject vehicle, thereby to determine whether or not the preceding vehicle is a bus. The size, type, and form of a bus are not particularly limited. Passengers who utilize a bus in the present embodiment get on and off the bus at bus stops provided on a public road. The bus determination method is not limited to the above-described method.

The bus traveling location determination process will then be described with reference to FIG. 4.

Figure 4:
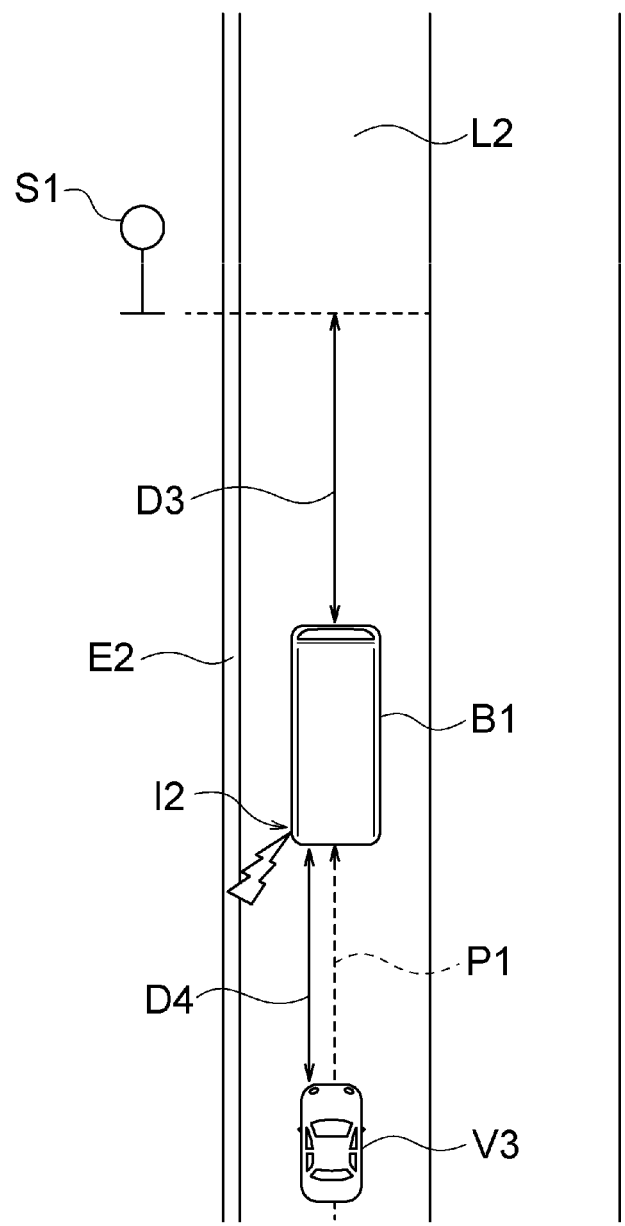
FIG. 4 is a diagram for describing an example of the driving assistance process in a second embodiment of the present invention.

FIG. 4 is a diagram for describing an example of a driving assistance process in the present embodiment. The subject vehicle V3 is traveling on a road with one lane in each direction (lane L2), and a bus B1 is traveling as a preceding vehicle ahead of the subject vehicle V3. The subject vehicle V3 is following the preceding vehicle while keeping the inter-vehicle distance to the bus B1 (distance D4) constant by the above-described inter-vehicle distance keeping process. At the same time, the subject vehicle V3 is following the travel route (travel route P1) along which the bus B1 has traveled, by the above-described travel route following process. A bus stop S1 is provided ahead of the bus B1 on the left side with respect to the traveling direction of the bus B1. FIG. 4 illustrates a situation in which the subject vehicle V3 and the bus B1 will reach the bus stop S1 if continuing to travel in the lane L2. In the example of FIG. 4, the lane L2 is illustrated as a straight road, but the shape of the lane L2 is not particularly limited.

When the preceding vehicle is a bus, the processor 111 first specifies a bus stop at which the preceding vehicle may stop. For example, the processor 111 uses the planned travel route of the subject vehicle and the traveling position of the subject vehicle which are calculated by the navigation device 220. Using the planned travel route and the traveling position, the processor 111 specifies a bus stop located closest to the current traveling position among bus stops existing on the planned travel route. Specifically, the processor 111 specifies coordinates that represent a bus stop in the map information 222. The method of specifying the bus stop is not limited to the above-described method. For example, among a plurality of bus stops existing within a predetermined range from the traveling position of the subject vehicle, a bus stop which the subject vehicle will pass first on the planned travel route may also be specified as the bus stop. In the example of FIG. 4, the processor 111 specifies the bus stop S1 using the above-described method.

The processor 111 then calculates the traveling position (coordinates) of the preceding vehicle in the map information 222 using the detection result of the position detection device 221 and the detection result of the object detection device 230. The method of calculation is the same as the traveling location determination process executed by the processor 11 according to the above-described embodiment, so the description in the above-described embodiment will be borrowed herein.

Then, the processor 111 calculates the distance from the preceding vehicle to the bus stop on the basis of the map information 222. For example, the processor 111 calculates the distance from the preceding vehicle to the bus stop in the map information 222 on the basis of the coordinates of the preceding vehicle, the coordinates of the bus stop, and the link of the lane. Specifically, the processor 111 calculates the distance of the link existing between the coordinates of the preceding vehicle and the coordinates of the bus stop. The calculated distance is a distance corresponding to an actual road shape rather than a linear distance connecting the two sets of coordinates. In the example of FIG. 4, the processor 111 calculates a distance D3 from the bus B1 to the bus stop S1.

The method of calculating the distance from the preceding vehicle to the bus stop is not limited to the above-described method. For example, the processor 111 may also calculate the distance from the subject vehicle to the bus stop from the coordinates of the subject vehicle, the coordinates of the bus stop, and the link information of the lane. Then, the processor 111 may calculate the distance from the preceding vehicle to the bus stop by subtracting the inter-vehicle distance between the subject vehicle and the preceding vehicle, which is a detection result of the object detection device 230, from the calculated distance.

The processor 111 determines whether or not the preceding vehicle is traveling in an area including the bus stop and the vicinities of the bus stop in accordance with whether or not the distance from the preceding vehicle to the bus stop is within a predetermined threshold. When the distance from the preceding vehicle to the bus stop is not more than the predetermined threshold, the processor 111 determines that the preceding vehicle is traveling in the area including the bus stop and the vicinities of the bus stop. On the other hand, when the calculated distance exceeds the predetermined threshold, the processor 111 determines that the preceding vehicle is traveling outside the area including the bus stop and the vicinities of the bus stop. In the example of FIG. 4, when the distance D3 is not more than the predetermined threshold, the processor 111 determines that the bus B1 is traveling in the area including the bus stop S1 and the vicinities of the bus stop S1.

The vicinities of a bus stop refer to a region before the bus stop in which a direction indicator may be lit to stop at the bus stop. In the example of FIG. 4, the vicinities of the bus stop include a region in which the driver operates the left-side direction indicator to light before the bus stop S1 in order to stop at the bus stop S1. The vicinities of the bus stop S1 refer, for example, to an area of 30 m before the bus stop from the traffic sign which indicates the bus stop.

The processor 111 can set the above-described predetermined threshold in units of several meters and can appropriately set the predetermined threshold in accordance with the type of a road, the number of lanes, the amount of traffic, etc. The processor 111 may set a predetermined threshold for each land area in which the subject vehicle travels. Preferably, the predetermined threshold is set in consideration of the distance between bus stops. Preferably, for example, the minimum value of the predetermined threshold is set to the distance from the traffic sign indicating the bus stop to a position at which the direction indicator is lit before the bus stop, and the maximum value of the predetermined threshold is set to the distance between bus stops. This allows an accurate determination to be made as to whether or not the preceding vehicle is traveling in the area including a bus stop and the vicinities of the bus stop.

In the present embodiment, the preceding vehicle may light the direction indicator to stop at a bus stop because the preceding vehicle is a bus. The processor 111, therefore, determines whether or not the preceding vehicle lights the direction indicator outside a region including an intersection and the vicinities of the intersection, in accordance with the distance from the preceding vehicle to the bus stop. For example, when the distance from the preceding vehicle to the bus stop is not more than a predetermined threshold, the preceding vehicle is traveling in the vicinities of the bus stop. In general, because no bus stop is provided in the vicinities of an intersection, the processor 111 can determine that the preceding vehicle is traveling outside the region including an intersection and the vicinities of the intersection.

The direction indicator lighting detection process will then be described.

When the preceding vehicle is traveling in the area including a bus stop and the vicinities of the bus stop, the processor 111 determines whether or not the direction indicator of the preceding vehicle on the road shoulder side has started lighting, on the basis of the detection result of the object detection device 230. The method of detecting the lighting of the direction indicator is the same as the lighting detection process executed by the processor 11 according to the above-described embodiment, so the description in the above-described embodiment will be borrowed herein. In the example of FIG. 4, a left-side direction indicator 12 of the bus B1 is the direction indicator on a road shoulder E2 side. The processor 111 detects that the left-side direction indicator 12 of the bus B1 is lighting.

The deceleration process is the same process as the deceleration process executed by the processor 11 of the above-described embodiment, so the description in the above-described embodiment will be borrowed herein.

The travel route follow-up cancellation process will then be described.

When determining that the direction indicator of the preceding vehicle on the road shoulder side is lighting, the processor 111 generates a control command for canceling the follow-up to the travel route of the preceding vehicle. For example, the processor 111 generates a control command for the subject vehicle to travel without being affected by the position of the preceding vehicle in the vehicle width direction. The control command includes a command to control the steering device 270 or the braking device 261. The processor 111 sends the generated control command to the vehicle controller 210 via the communication device 30. The vehicle controller 210 controls the driving of the subject vehicle in accordance with the driving assistance process so that the subject vehicle travels regardless of the position of the preceding vehicle in the vehicle width direction. In the example of FIG. 4, the travel route follow-up cancellation process executed by the processor 111 allows the subject vehicle V3 to travel along a travel route different from the travel route P1 along which the bus B1 has traveled.

The overtaking preparation process will then be described.

The processor 111 generates a control command for the subject vehicle to travel near the white line on the right side with respect to the traveling direction of the subject vehicle, on the basis of the detection result of the object detection device 230. For example, the processor 111 executes a white line detection process on an image captured by the camera 231. When the processor 111 detects the white lines provided on both sides of the lane for traveling, the processor 111 generates a control command to vary the distances from the subject vehicle to the white lines. Specifically, the processor 111 generates a control command for the subject vehicle to travel in a state of keeping a predetermined distance with respect to the right-side white line. The predetermined distance is preferably a distance that allows the subject vehicle to travel near the right-side white line. The control command includes a command to control the steering device 270 or the braking device 261. The processor 111 sends the generated control command to the vehicle controller 210 via the communication device 30. The vehicle controller 210 controls the driving of the subject vehicle in accordance with the driving assistance process so that the subject vehicle travels in a state of keeping the predetermined distance with respect to the right-side white line. The method for traveling on the right side of a lane is not limited to the above-described method. For example, when the center line is provided for a lane, the processor 111 may also generate a control command to travel in a state of keeping a predetermined distance on the right side from the center line.

The overtaking determination process will then be described with reference to FIG. 5.

Figure 5:
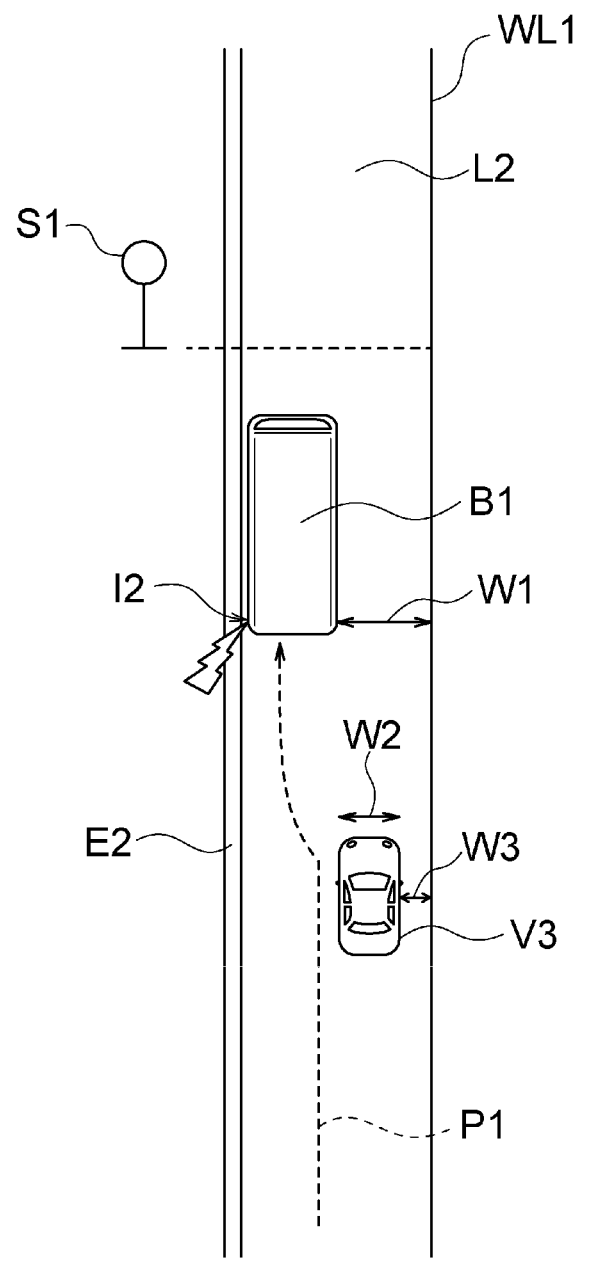
FIG. 5 is a diagram for describing another example of the driving assistance process in the second embodiment.

FIG. 5 is a diagram for describing another example of the driving assistance process in the present embodiment. FIG. 5 illustrates a scene in which a certain time has elapsed from the scene illustrated in FIG. 4. The bus B1 decelerates while lighting the left-side direction indicator I2 and is about to stop at the bus stop S1. The subject vehicle V3 is decelerated by the above-described deceleration process. At the same time, the subject vehicle V3 is in a state capable of traveling along a travel route different from the travel route (travel route P1) along which the bus B1 has traveled, by the above-described travel route follow-up cancellation process. Furthermore, the subject vehicle V3 is traveling near the right-side white line WL1 in a state of keeping a predetermined distance W3 with respect to the right-side white line WL1 by the above-described overtaking preparation process.

The processor 111 determines whether or not it is possible to overtake the preceding vehicle, on the basis of detection result of the object detection device 230. For example, the processor 111 calculates the distance from the preceding vehicle to the right-side white line using an image captured by the camera 231 mounted on the front part of the subject vehicle. When the calculated distance is longer than the vehicle width of the subject vehicle, which is preliminarily stored in a storage device such as a ROM, the processor 111 determines that the subject vehicle can overtake the preceding vehicle. On the other hand, when the calculated distance is not longer than the vehicle width of the subject vehicle, the processor 111 determines that the subject vehicle cannot overtake the preceding vehicle. In the example of FIG. 5, the processor 111 compares a distance W1 from the bus B1 to the right-side white line WL1 with a vehicle width W2 of the subject vehicle V3. In the example of FIG. 5, when the distance W1 is longer than the vehicle width W2 of the subject vehicle V3, the processor 111 determines that the subject vehicle V3 can pass through a space between the bus B1 and the right-side white line WL1 to overtake the bus B1.

The processor 111 may take into account the vehicle speed or acceleration/deceleration of the preceding vehicle to determine whether or not it is possible to overtake the preceding vehicle. For example, when the distance from the preceding vehicle to the right-side white line is longer than the vehicle width of the subject vehicle, the processor 111 may acquire the speed or acceleration of the preceding vehicle from the object detection device 230. Then, when the vehicle speed of the preceding vehicle is not higher than a predetermined speed, the processor 111 may determine that it is possible to overtake the preceding vehicle. In this case, the subject vehicle overtakes the preceding vehicle by the overtaking process, which will be described below, in a state in which the preceding vehicle has decelerated, and it is therefore possible to prevent an uncomfortable feeling given to the occupants of the subject vehicle regarding the traveling of the subject vehicle.

The overtaking process will be finally described with reference to FIG. 6.

Figure 6:
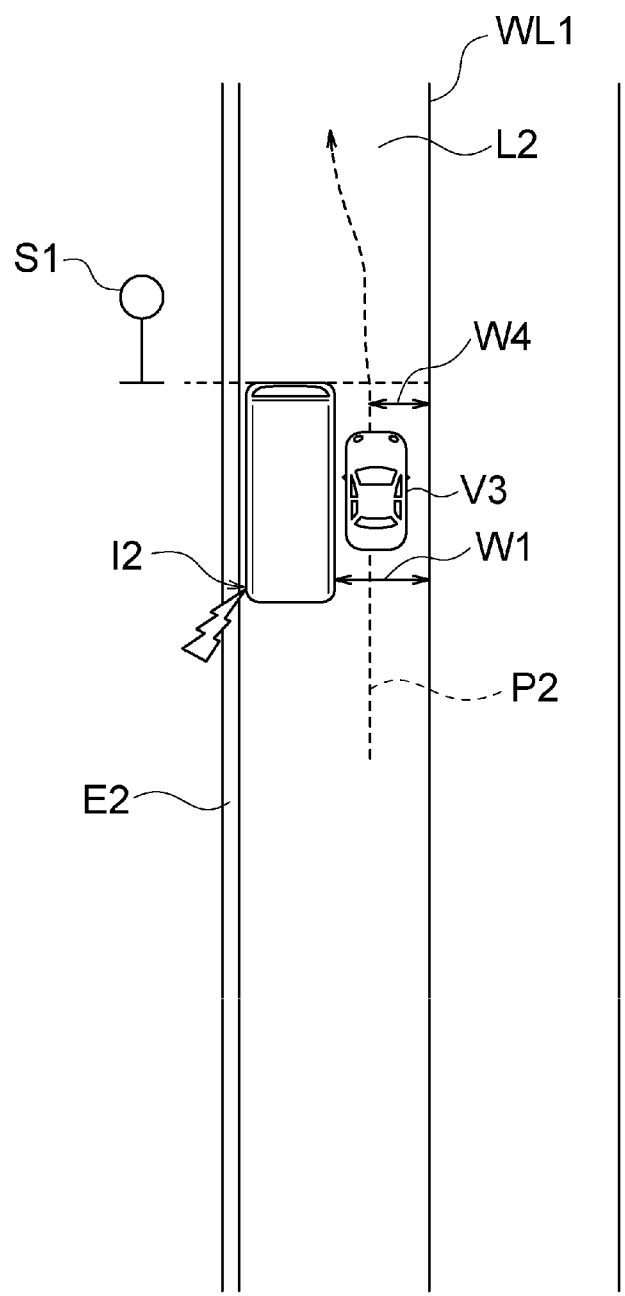
FIG. 6 is a diagram for describing another example of the driving assistance process in the second embodiment.

FIG. 6 is a diagram for describing another example of the driving assistance process in the present embodiment. FIG. 6 illustrates a scene in which a certain time has elapsed from the scene illustrated in FIG. 5. The bus B1 stops at the bus stop S1 while lighting the left-side direction indicator I2. The processor 111 determines that it is possible to overtake the bus B1, by the above-described overtaking determination process. FIG. 6 illustrates a scene in which the subject vehicle V3 overtakes the bus B1.

When determining that it is possible to overtake the preceding vehicle, by the overtaking determination process, the processor 111 generates a control command for overtaking the preceding vehicle. The control command includes a command to control the steering device 270, the braking device 261, or the drive device 260.

Specifically, the processor 111 sets a travel route for overtaking the preceding vehicle on the basis of the detected white line. For example, the processor 111 sets a travel route for traveling in a state of keeping a predetermined distance from the right-side white line as the travel route used when passing the preceding vehicle. The predetermined distance is preferably a half of the distance from the preceding vehicle to the right-side white line. The predetermined distance is not particularly limited, and the processor 111 can appropriately set the predetermined distance on the basis of the traffic situation and/or the traveling state of the preceding vehicle (such as a traveling direction, a vehicle speed, or acceleration/deceleration.).

Then, the processor 111 sets a travel route used after passing the preceding vehicle. For example, the processor 111 sets a travel route for traveling in a state of keeping the center of the lane as the travel route used after passing the preceding vehicle. The processor 111 not only sets the travel route but also sets the vehicle speed and/or acceleration/deceleration of the subject vehicle. For example, the processor 111 sets the vehicle speed or acceleration/deceleration of the subject vehicle so as to decelerate when passing the preceding vehicle and accelerate after passing the preceding vehicle.

Then, the processor 111 sends the control command, which includes the travel route and the vehicle speed and the like of the subject vehicle, to the vehicle controller 210 via the communication device 30. The vehicle controller 210 controls the driving of the subject vehicle so that the subject vehicle overtakes the preceding vehicle, in accordance with the driving assistance process.

In the example of FIG. 6, the travel route P2 is a travel route set by the processor 111. The subject vehicle V3 travels to pass through a space between the bus B1 and the right-side white line WL1 along the travel route P2 by the overtaking process for overtaking the preceding vehicle. When overtaking the bus B1, the subject vehicle V3 is traveling in a state of keeping a distance W4 from the right-side white line WL1. The distance W4 is a half of the distance W1 from the bus B1 to the right-side white line WL1.

The overtaking process for overtaking a preceding vehicle is not limited to the above-described process. For example, the processor 111 may regard the preceding vehicle as an obstacle when the preceding vehicle stops. In this case, the processor 111 generates a control command for overtaking while running over a lane boundary line in accordance with the situations around the subject vehicle. Information on the lane boundary line is included in the road information 223 of the navigation device 220 of the subject vehicle, and the processor 111 therefore acquires the information on the lane boundary line from the road information 223. The situations around the subject vehicle include not only the traffic situation in the lane in which the subject vehicle is traveling, but also the traffic situation in the opposite lane. Examples of the lane boundary line include a solid white line and a dotted white line.

To perceive the situations around the subject vehicle, for example, the processor 111 acquires the detection result of the object detection device 230. Using the acquired detection result, the processor 111 determines whether or not a following vehicle is present and/or whether or not an oncoming vehicle is present. Then, when the processor 111 determines, from the situation around the subject vehicle and information on the lane boundary line, an appropriate situation in which it is not problematic to run over the lane boundary line based on the traffic rules, the processor 111 generates a control command for overtaking the preceding vehicle while running over the lane boundary line. The processor 111 sends the generated control command to the vehicle controller 210 via the communication device 30. The vehicle controller 210 controls the driving of the subject vehicle so that the subject vehicle overtakes the preceding vehicle while running over the lane boundary line, in accordance with the driving assistance process.

Figure 7A:
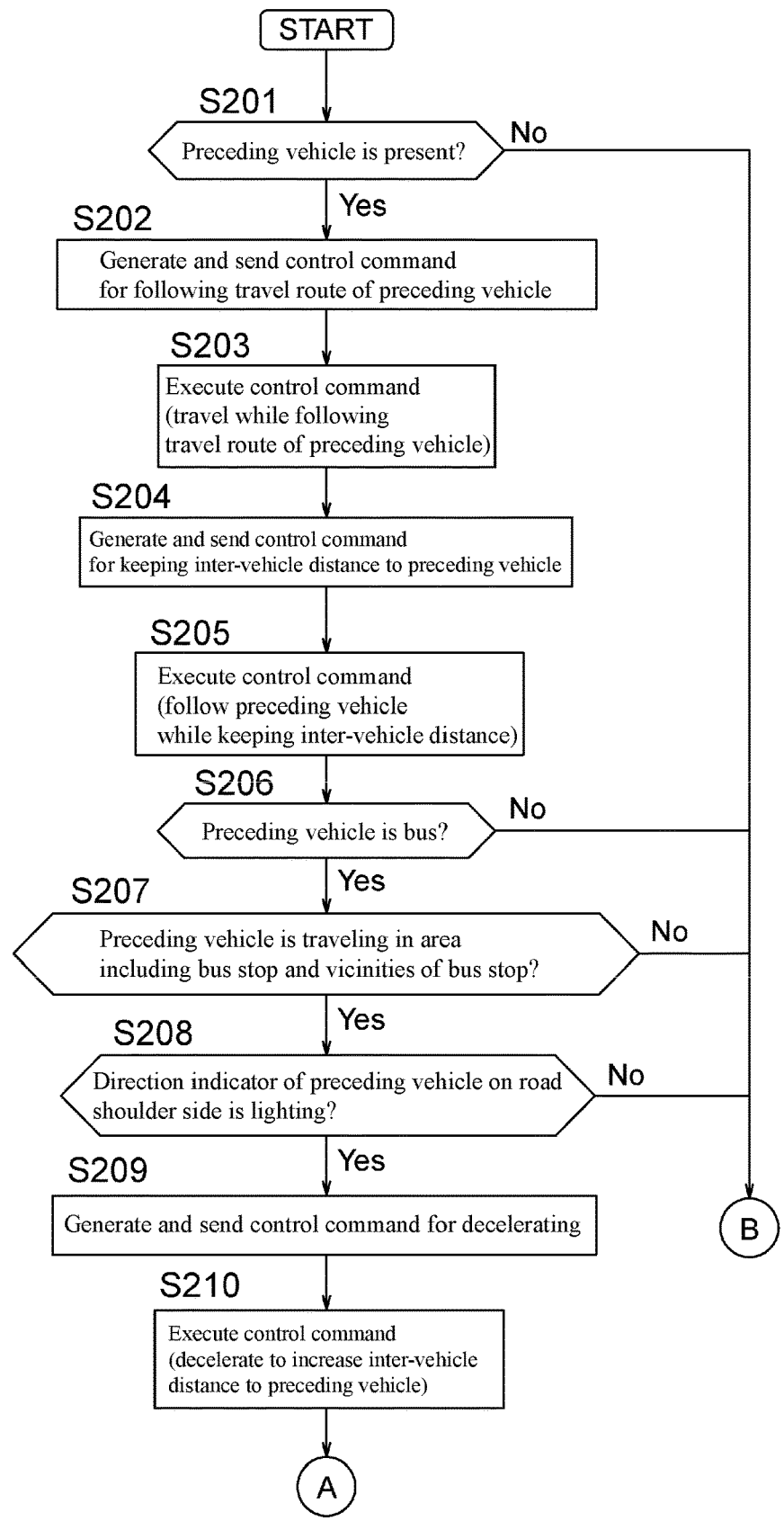
FIG. 7A is a flowchart illustrating a control procedure executed by the driving assistance system of the second embodiment.
Figure 7B:
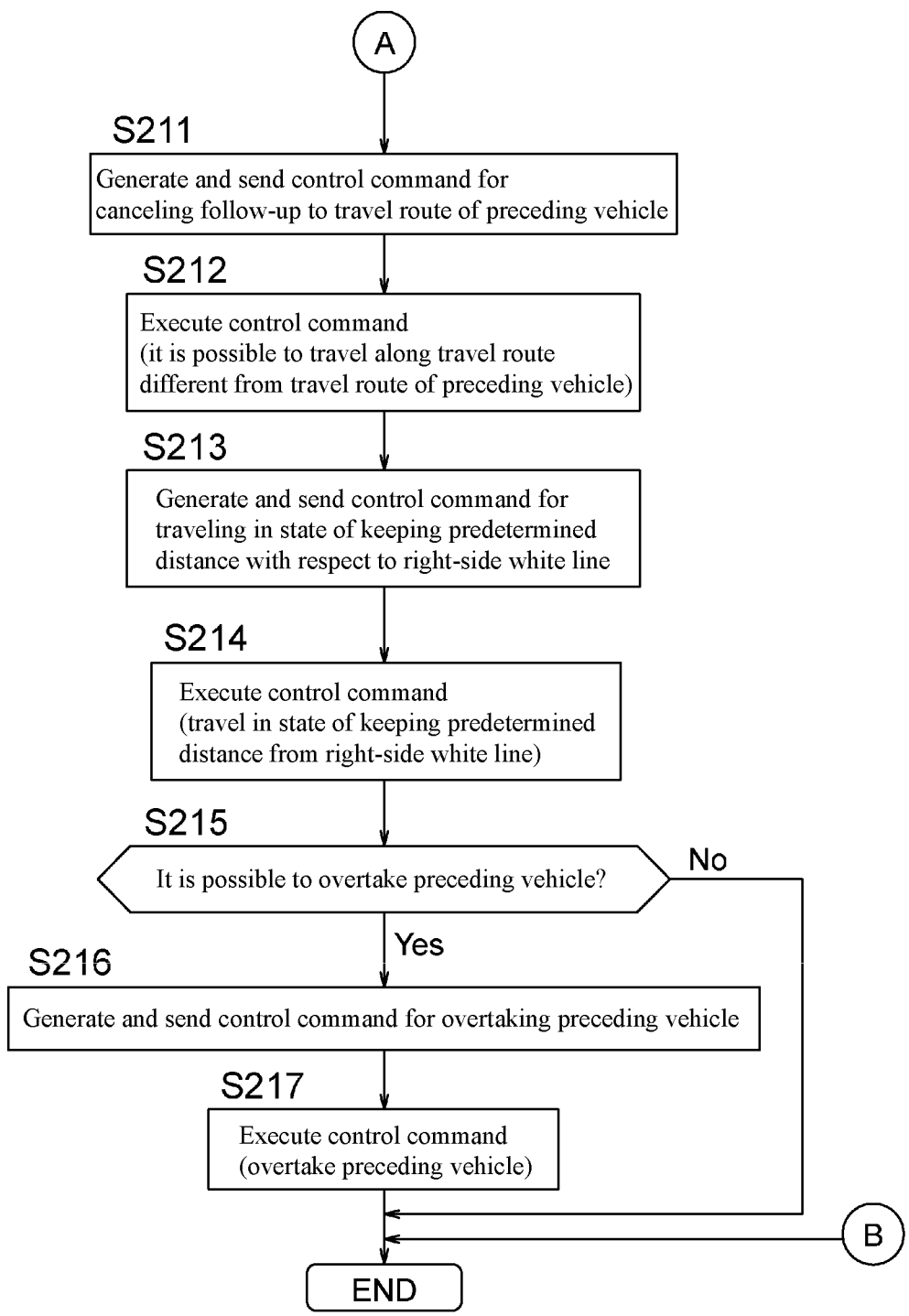
FIG. 7B is a flowchart illustrating a control procedure executed by the driving assistance system of the second embodiment.

FIGS. 7A and 7B are flowcharts illustrating a control procedure executed by the driving assistance system of the present embodiment. The control process for the driving assistance of the present embodiment will be described with reference to the flowcharts of FIGS. 7A and 7B. The control process for the driving assistance described below is repeatedly executed at predetermined time intervals.

Step S201 is a step corresponding to step S101 in the above-described embodiment, so the description in the above-described embodiment will be borrowed herein. That is, when a determination is made that a preceding vehicle is present ahead of the subject vehicle, the process proceeds to step S202, while when a determination is made that no preceding vehicle is present ahead of the subject vehicle, the control process for the driving assistance is ended.

In step S202, the processor 111 generates a control command for following the travel route of the preceding vehicle. The processor 111 acquires the relative position of the preceding vehicle in the vehicle width direction from the detection result of the radar device 232 of the subject vehicle. The processor 111 generates a control command to follow the preceding vehicle so that the relative position of the preceding vehicle in the vehicle width direction is kept constant, and sends the generated control command to the vehicle controller 210.

In step S203, the vehicle controller 210 executes the control command generated in step S202. This allows the subject vehicle to follow the travel route of the preceding vehicle.

Steps S204 and S205 are steps corresponding respectively to steps S102 and S103 in the above-described embodiment, so the description in the above-described embodiment will be borrowed herein. That is, in step S204, the processor 111 generates a control command for keeping the inter-vehicle distance to the preceding vehicle constant and sends the generated control command to the vehicle controller 210. In step S205, the vehicle controller 210 executes the control command generated in step S204. The subject vehicle follows the preceding vehicle while keeping the inter-vehicle distance constant.

In step S206, the processor 111 determines whether or not the preceding vehicle is a bus. The processor 111 acquires an image captured ahead of the subject vehicle from the object detection device 230 of the subject vehicle. Then, the processor 111 executes the image processing thereby to determine whether or not the preceding vehicle is a bus. When a determination is made that the preceding vehicle is a bus, the process proceeds to step S207, while when a determination is made that the preceding vehicle is not a bus, the control process for the driving assistance is ended.

In step S207, the processor 111 determines whether or not the preceding vehicle is traveling in the area including a bus stop and the vicinities of the bus stop. For example, the processor 111 specifies, in the map information 222, a bus stop located closest to the current traveling position of the preceding vehicle. Then, the processor 111 calculates the distance from the current traveling position of the preceding vehicle to the specified bus stop. When the calculated distance does not exceed a predetermined threshold, the processor 111 determines that the preceding vehicle is traveling in the area including the bus stop and the vicinities of the bus stop. On the other hand, when the calculated distance exceeds the predetermined threshold, the processor 111 determines that the preceding vehicle is traveling outside the area including the bus stop and the vicinities of the bus stop. When the preceding vehicle is traveling in the area including the bus stop and the vicinities of the bus stop, the process proceeds to step S208. On the other hand, when the preceding vehicle is traveling outside the area including the bus stop and the vicinities of the bus stop or when the preceding vehicle is traveling in an area including an intersection and the vicinities of the intersection, the control process for the driving assistance is ended.

Step S208 is a step corresponding to step S105 in the above-described embodiment, so the description in the above-described embodiment will be borrowed herein. That is, when a determination is made that the direction indicator of the preceding vehicle on the road shoulder side is lighting, the process proceeds to step S209. On the other hand, when a determination is made that the direction indicator on the road shoulder side is not lighting, the control process for the driving assistance is ended.

Steps S209 and S210 are steps corresponding respectively to steps S106 and S107 in the above-described embodiment, so the description in the above-described embodiment will be borrowed herein. That is, in step S209, the processor 111 generates a control command for decelerating and sends the generated control command to the vehicle controller 210. In step S210, the vehicle controller 210 executes the control command generated in step S209. The inter-vehicle distance to the preceding vehicle increases because the subject vehicle decelerates.

In step S211, the processor 111 generates a control command for canceling the follow-up to the travel route of the preceding vehicle. The processor 111 generates a control command for stopping the follow-up to the travel route of the preceding vehicle and sends the generated control command to the vehicle controller 210.

In step S212, the vehicle controller 210 executes the control command generated in step S211. This allows the subject vehicle to travel along a travel route different from the travel route of the preceding vehicle.

In step S213, the processor 111 generates a control command for traveling near the white line on the right side with respect to the traveling direction of the subject vehicle. The processor 111 detects white lines provided on both sides of the lane from an image captured ahead of the subject vehicle. The processor 111 generates a control command for the subject vehicle to travel in a state of keeping a predetermined distance with respect to the right-side white line and sends the generated control command to the vehicle controller 210.

In step S214, the vehicle controller 210 executes the control command generated in step S213. The subject vehicle travels near the right side of the lane while keeping the predetermined distance from the right-side white line.

In step S215, the processor 111 determines whether or not it is possible to overtake the preceding vehicle. For example, the processor 111 calculates the distance from the preceding vehicle to the right-side white line using an image captured ahead of the subject vehicle and determines whether or not the calculated distance is longer than the vehicle width of the subject vehicle. When the calculated distance is longer than the vehicle width of the subject vehicle, the processor 111 determines that it is possible to overtake the preceding vehicle. On the other hand, when the calculated distance is not longer than the vehicle width of the subject vehicle, the processor 111 determines that it is not possible to overtake the preceding vehicle. When it is possible to overtake the preceding vehicle, the process proceeds to step S216, while when it is not possible to overtake the preceding vehicle, the control process for the driving assistance is ended.

In step S216, the processor 111 generates a control command for overtaking the preceding vehicle. For example, the processor 111 sets a travel route for traveling at the center of a space between the preceding vehicle and the right-side white line as the travel route used when passing the preceding vehicle. The processor 111 also sets a travel route for traveling at the center of the lane as the travel route used after passing the preceding vehicle. The processor 111 not only sets the travel route but also sets an appropriate vehicle speed or acceleration/deceleration for overtaking. The processor 111 sends the control command, which includes the travel route and the vehicle speed and the like of the subject vehicle, to the vehicle controller 210.

In step S217, the vehicle controller 210 executes the control command generated in step S216. The subject vehicle overtakes the preceding vehicle which stops at the bus stop or decelerates near the bus stop.

As described above, in the present embodiment, the driving assistance different from the driving assistance to follow the preceding vehicle is driving assistance to control the steering of the subject vehicle. This allows the appropriate driving assistance to be executed in accordance with the situation of the preceding vehicle.

In the present embodiment, the driving assistance different from the driving assistance to follow the preceding vehicle is driving assistance to travel in a state of keeping a predetermined distance with respect to the right-side white line. This allows appropriate positioning for overtaking before overtaking the preceding vehicle, and appropriate driving assistance can be executed in accordance with the surrounding situations.

In the present embodiment, the driving assistance different from the driving assistance to follow the preceding vehicle is driving assistance to overtake the preceding vehicle when the vehicle speed of the preceding vehicle is not higher than a predetermined vehicle speed. This can prevent the subject vehicle from staying behind the preceding vehicle, and the driving assistance can be executed without giving an uncomfortable feeling to the occupants.

In the present embodiment, the driving assistance different from the driving assistance to follow the preceding vehicle is driving assistance to overtake the preceding vehicle while running over the right-side lane boundary line. This allows the driving assistance to be executed to appropriately overtake the preceding vehicle in accordance with the surrounding situations, the lane width, and the vehicle width of the preceding vehicle.

In the present embodiment, when the subject vehicle follows the travel route of the preceding vehicle, the driving assistance different from the driving assistance to follow the preceding vehicle is driving assistance not to follow the travel route of the preceding vehicle. This can prevent the subject vehicle from stopping on a road shoulder to follow the preceding vehicle, and an uncomfortable feeling given to the occupants can be alleviated.

In the present embodiment, the processor 111 determines whether or not the preceding vehicle is a bus, and when the preceding vehicle is a bus, the processor 111 determines whether or not the preceding vehicle is traveling outside the area including an intersection and the vicinities of the intersection, on the basis of the distance from the preceding vehicle to a bus stop. This allows a determination to be accurately made as to whether the purpose of lighting the direction indicator is to turn to the right or left at the intersection or to stop on the road shoulder.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described second embodiment, a configuration is exemplified in which the overtaking process executed by the processor 111 includes setting a travel route from the positional relationship between the preceding vehicle and the right-side white line, but the present invention is not limited to this. For example, when there is a following vehicle that is traveling to follow the subject vehicle, the processor 111 can utilize the travel route of the following vehicle. When the following vehicle has overtaken the preceding vehicle before the subject vehicle overtakes the preceding vehicle, the processor 111 can set the travel route, along which the following vehicle has overtaken the preceding vehicle, as the travel route for overtaking. In this case, the subject vehicle follows the travel route of the following vehicle to overtake the preceding vehicle in accordance with the driving assistance process executed by the processor 111. This allows the driving assistance to be executed with an alleviated uncomfortable feeling given to the occupants.

In the above-described two embodiments, cases are exemplified in which the subject vehicle travels along a road with one lane in each direction, but the present invention is not limited to this. For example, in a scene with two lanes in each direction, a scene with two-way traffic (a road without a center divider), and other roads, the processor 11 or 111 can execute the above-described various driving assistance processes.

In the present description, the driving assistance apparatus according to the present invention is described with reference to an example of the driving assistance apparatus 100 or 110 comprising the control device 10, the output device 20, and the communication device 30, but the present invention is not limited to this.

In the present description, the communication equipment according to the present invention is described with reference to an example of the communication device 30, but the present invention is not limited to this.

DESCRIPTION OF REFERENCE NUMERALS

1 Driving assistance system
100 Driving assistance apparatus
10 Control device
11 Processor
20 Output device 30 Communication device
200 Onboard apparatus
210 Vehicle controller
220 Navigation device
221 Position detection device
222 Map information
223 Road information
230 Object detection device
231 Camera
232 Radar device
240 Output device
241 Display
242 Speaker
250 Detection device
251 Steering angle sensor
252 Vehicle speed sensor
253 Attitude sensor
260 Drive device
261 Braking device
270 Steering device

The invention claimed is:

1. A driving assistance apparatus comprising a processor that allows execution of a driving assist process for a subject vehicle on a basis of a detection result from a sensor that detects a situation around the subject vehicle,
the processor being configured to: when a preceding vehicle is recognized by the sensor,
execute a first driving assistance process to keep an inter-vehicle distance to the preceding vehicle constant; and
determine whether or not the preceding vehicle is traveling outside an area including an intersection and vicinities of the intersection;
when the preceding vehicle is traveling outside the area, determine whether or not a direction indicator of the preceding vehicle on a road shoulder side is lighting; and
when the direction indicator of the preceding vehicle is lighting, generate a control command for stopping the first driving assistance process and performing a second driving assistance process different from the first driving assistance process, the first driving assistance process being to follow the preceding vehicle,
the second driving assistance process being a driving assistance process for increasing the inter-vehicle distance to the preceding vehicle.

2. The driving assistance apparatus according to claim 1, wherein the second driving assistance process is a driving assistance process to decelerate the subject vehicle thereby to increase the inter-vehicle distance to the preceding vehicle.

3. The driving assistance apparatus according to claim 1, wherein the second driving assistance process includes a driving assistance process for traveling in a state of keeping a predetermined distance with respect to a lane boundary line or a center line on the opposite side to the road shoulder side in a subject vehicle lane in which the subject vehicle is traveling.

4. The driving assistance apparatus according to claim 1, wherein the second driving assistance process is a driving assistance process to control a vehicle speed of the subject vehicle.

5. The driving assistance apparatus according to claim 1, wherein the second driving assistance process is a driving assistance process to control steering of the subject vehicle.

6. The driving assistance apparatus according to claim 1, wherein the second driving assistance process is a driving assistance process for the subject vehicle to travel in a state of keeping a predetermined distance with respect to the opposite side to the road shoulder side.

7. The driving assistance apparatus according to claim 1, wherein the second driving assistance process is a driving assistance process to overtake the preceding vehicle when a vehicle speed of the preceding vehicle is not higher than a predetermined vehicle speed.

8. The driving assistance apparatus according to claim 7, wherein the second driving assistance process is a driving assistance process to overtake the preceding vehicle while running over a given lane boundary line.

9. The driving assistance apparatus according to claim 1, wherein the second driving assistance process is a driving assistance process to increase the inter-vehicle distance between the subject vehicle and the preceding vehicle when the subject vehicle keeps the inter-vehicle distance by the first driving assistance process.

10. The driving assistance apparatus according to claim 1, wherein the processor is further configured to:
determine whether or not the preceding vehicle is a bus; and
when the preceding vehicle is a bus, determine whether or not the bus is traveling outside the area, on a basis of a distance between the bus and a bus stop.

11. The driving assistance apparatus according to claim 7, wherein
the processor is further configured to determine whether or not there is another vehicle overtaking the preceding vehicle, and
the second driving assistance process is a driving assistance process to, when the other vehicle has overtaken the preceding vehicle, follow a travel route along which the other vehicle has overtaken the preceding vehicle.

12. A driving assistance method performed using a processor used in a driving assistance process for a subject vehicle, the driving assistance method comprising:
when a preceding vehicle is recognized by a sensor that detects a situation around the subject vehicle,
executing a first driving assistance process to keep an inter-vehicle distance to the preceding vehicle constant; and
determining whether or not the preceding vehicle is traveling outside an area including an intersection and vicinities of the intersection;
when the preceding vehicle is traveling outside the area, determining whether or not a direction indicator of the preceding vehicle on a road shoulder side is lighting; and
when the direction indicator of the preceding vehicle is lighting, terminating the first driving assistance process and performing a second driving assistance process different from the first driving assistance process, the first driving assistance process being to follow the preceding vehicle,
the second driving assistance process being a driving assistance process for increasing the inter-vehicle distance to the preceding vehicle.

* * * * *